United States Patent [19]

Carter

[11] 4,356,945

[45] Nov. 2, 1982

[54] MOTION PICTURE PRINTING MACHINE HAVING INTERCHANGEABLE FILM RECEIVING UNITS

[75] Inventor: William D. Carter, Rancho Palos Verdes, Calif.

[73] Assignee: Carter Equipment Co., Inc., Lawndale, Calif.

[21] Appl. No.: 186,264

[22] Filed: Sep. 11, 1980

[51] Int. Cl.³ ............................................ B65H 17/38
[52] U.S. Cl. ............................................ 226/6; 226/53
[58] Field of Search ........................ 226/6, 52, 54–59, 226/188

[56] References Cited

U.S. PATENT DOCUMENTS 2,364,148  12/1944  Kellogg ........................ 242/DIG. 6
3,512,693   5/1970  Utsumi ................................ 226/54

*Primary Examiner*—Leonard D. Christian
*Attorney, Agent, or Firm*—Gene W. Arant; Paul H. Ware

[57] ABSTRACT

A motion picture printing machine is equipped with separate printing modules for the picture track and the sound track. Each module can be removed from the machine. It is therefore possible to use one set of printing modules for printing one size of film, and then to change to a different set of printing modules for printing a different size of film.

More specifically, the machine has a vertical frame member with drive and control mechanisms that are supported on its rear side, while the removable printing modules are attached to its front side. Each printing module includes at least one driven sprocket that is carried on a sprocket drive shaft. The sprocket drive shaft is aligned concentric with, but not directly attached to, a driven shaft that is rotatably supported on the rear side of the frame member. The two plates of a friction clutch are carried on the adjacent ends of these two shafts. A means for activating the clutch is a permanent part of the machine carried on the rear side of the frame member. When a particular printing module is removed from the machine, the clutch plate associated with each driven sprocket is removed as part of the module.

4 Claims, 6 Drawing Figures

MOTION PICTURE PRINTING MACHINE HAVING INTERCHANGEABLE FILM RECEIVING UNITS

BACKGROUND OF THE INVENTION

The present invention is an improvement over that disclosed and claimed in my U.S. Pat. No. 4,105,329 issued Aug. 8, 1978.

Film processing establishments have a need to minimize both the cost of their film printing equipment, and the space which it occupies. It is therefore extremely advantageous to have a machine which can be used first for a printing run of one size of film and then for a printing run of another size of film.

An important requirement of present day motion picture printers is that the longitudinal tension in the film must be properly controlled in order to avoid damage to the film.

SUMMARY OF THE INVENTION

According to one feature of the invention, the film printing machine is equipped with modular film printing units that are removable from the main frame of the machine. Thus when 16 millimeter film is to be printed, modular units adapted to print that size of film are attached to the main frame, and when 35 millimeter film is to be printed, the first set of printing units are removed and a second set which are specifically designed to receive 35 millimeter film are attached.

According to another feature of the invention a magnetically controlled clutch is incorporated in each of the film drive assemblies, thereby making it possible to more precisely control the longitudinal tension in the film.

According to a third feature of the invention the clutches which impart power to the various drive assemblies are located in such a position as to facilitate the convenient removal of modular film printing units from the machine. Specifically, each clutch is so positioned that one of its friction plates remains with the main frame of the machine while its other friction plate remains a part of a modular printing unit, whether it is attached to or detached from the main frame.

Another important feature of the machine according to the present invention is that when film tension becomes too high or too low, the clutches in the film drive assemblies are decoupled, enabling the film transport to stop very quickly without damaging the film.

DRAWING SUMMARY

THE MACHINE, IN GENERAL

Figure 1:
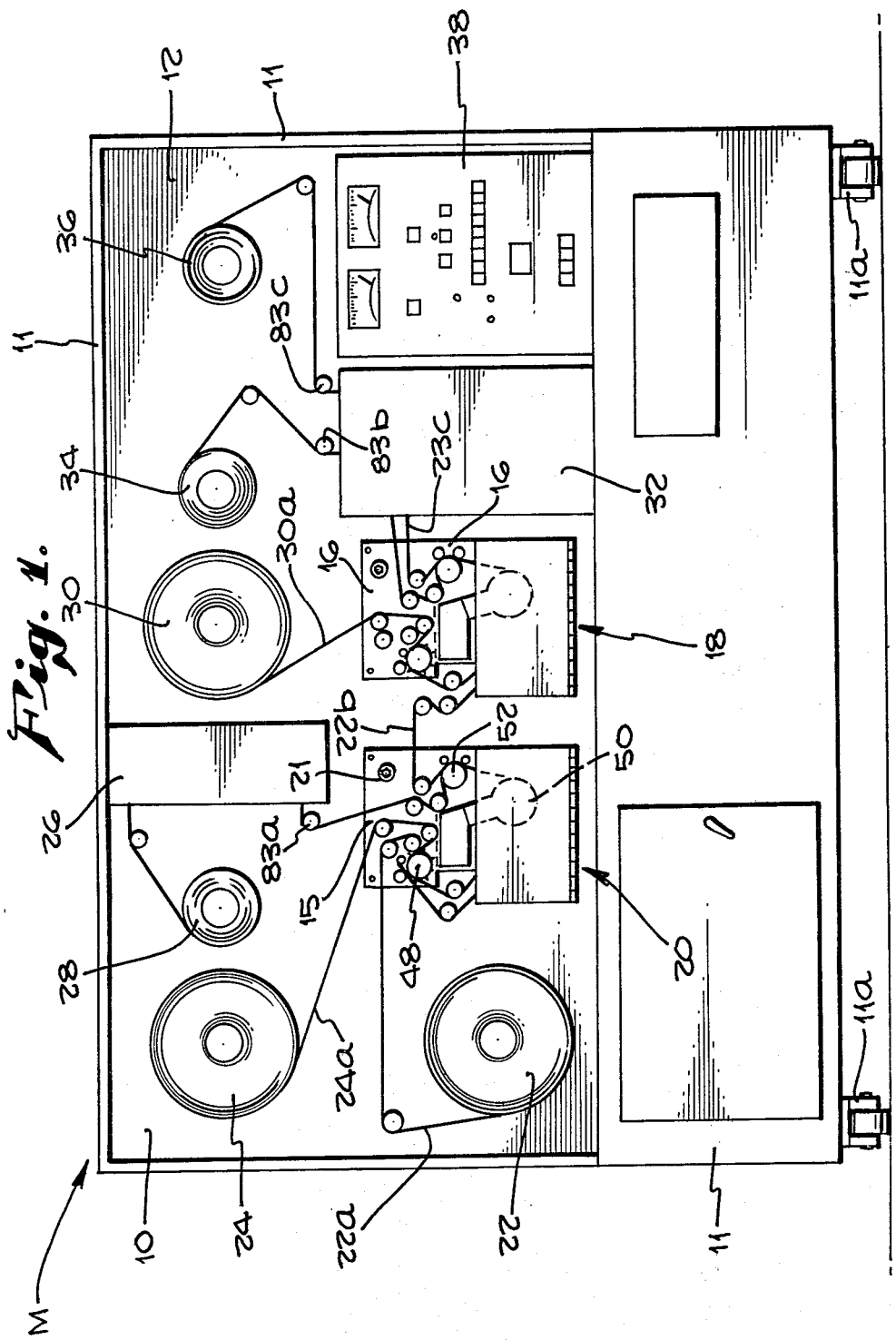
FIG. 1 is an elevation view of a complete motion picture printing film in accordance with the present invention, including both a picture printing unit and a sound printing unit.
Figure 3:
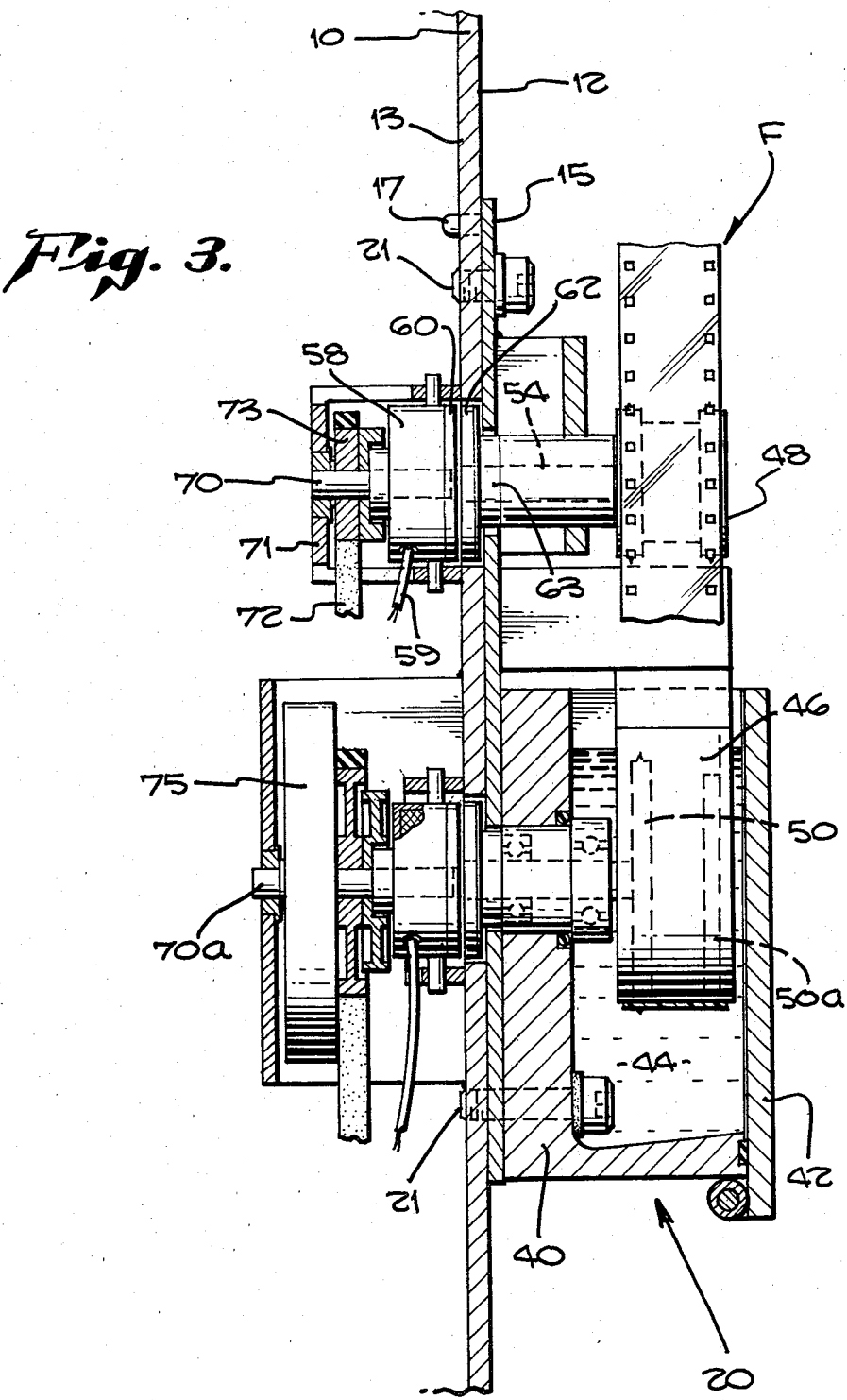
FIG. 3 is a vertical cross-sectional view of the printing unit of FIG. 2, taken on line 3—3 thereof.

As shown in FIG. 1 in conjunction with FIG. 3, the complete motion picture printing machine M includes a vertically disposed main frame member 10. Main frame member 10 is typically a heavy aluminum plate having a front side 12 and a rear side 13, as designated in FIG. 3. The plate 10 also has a transverse edge frame 11 supported by casters 11a on its bottom side. Various drive and control mechanisms are supported on the rear side 13 of the main frame member 10. An auxiliary plate 15 secured to the front side 12 of the main frame member 10 carries a removable modular printing unit 20. In similar fashion an auxiliary plate 16 carries a removable modular printing unit 18.

Referring now to FIG. 1, a feed roll 22 of raw stock (unexposed film) is supported on the left-hand side of the machine, and immediately above it is a feed roll 24 carrying the master picture film. The raw stock 22a and master picture film strip 24a are concurrently drawn into the first printing module 20 by means of a first drive sprocket 48. The function of module 20 is to continuously print picture frames from the master picture film strip onto the raw stock. As the printing is progressively completed, the master picture film passes through a drying unit 26 and hence to a take-up roll 28.

As the film supplied from the raw stock roll 22 passes horizontally out of the first printing unit 20, it is given the different designation of 22b, because it now has latent images. It then enters the sound printing module 18. At the same time, a sound track negative is fed from a sound track feed roll 30 that is positioned above the printing unit 18. This film 30a passes downward into the top of printing unit 18, and as the printing is completed, passes horizontally outward on the right-hand side of a driver 32. It then passes upward from the dryer 32 to a take-up roll 34. The film which was originally raw stock is now designated 23c as it leaves the second printing unit, since it now carries latent images or exposures of both the picture and the sound. This film also passes through the dryer 32 and hence to a take-up roll 36.

Also a part of the complete machine M is a control panel 38 shown on the right-hand side of FIG. 1. The specific structure and functions of the control panel, however, have little pertinence to the subject matter of the present invention.

INTERCHANGEABLE PRINTING UNITS

In FIGS. 2, 3, 5 and 6 the modular printing unit 20 is shown in some detail. It will be understood, however, that the printing units 20 and 18 are constructed in the same general manner but not necessarily interchangeable.

It is also true that during a particular film printing operation both the picture printing unit 20 and the sound printing unit 18 are of such size and configuration as to accept a particular film size. For example, when a 35 millimeter film is being printed, both of the printing units 20, 18 are of suitable size and configuration to transfer images from a 35 millimeter master onto 35 millimeter stock. See FIG. 3. At the same time all of the feed rolls, idler rollers, and take-up rolls used in the machine are of such size as to accommodate 35 millimeter film.

Figure 4:
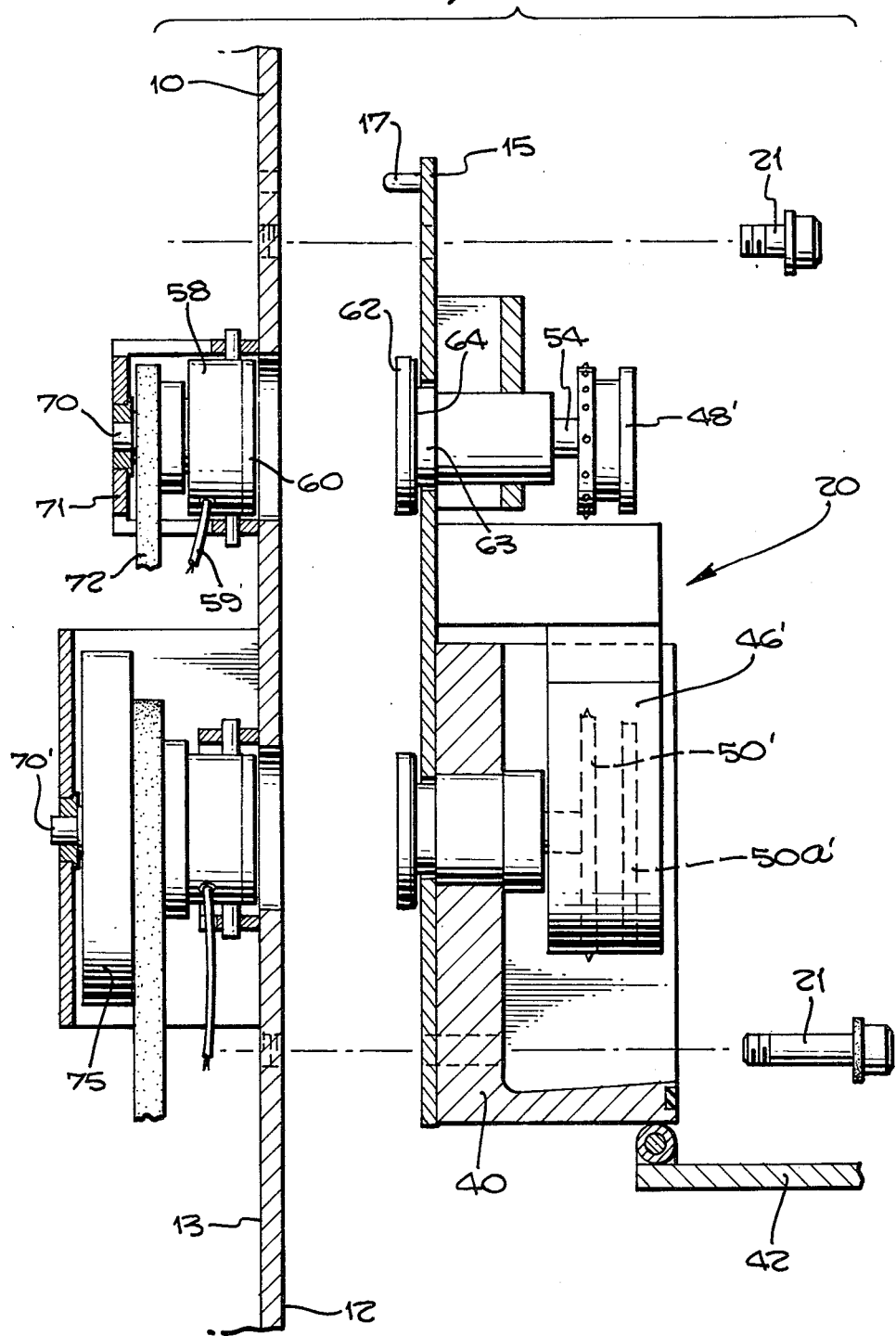
FIG. 4 is a view like FIG. 3 of a smaller printing module separated from the main frame of the machine.

If it is then desired to print a 16 millimeter film, the original modular printing units 20, 18 are removed from the machine, and in their place are attached two other modular units which are adapted to receive the smaller size of film, see FIG. 4. Supply rolls and take-up rolls are changed at the same time, but some of the idler rollers that were used for 35 millimeter film may also be used for the smaller size film.

STRUCTURE OF PRINTING MODULE

The structure of printing module 20 will now be described with reference to FIGS. 2 through 5, inclusinve.

As best seen in FIG. 3, the lower part of auxiliary plate 15 supports a printing tank. The bottom wall of the printing tank is designated by numeral 40 while its hinged outer wall is designated by numeral 42. A body of liquid 44 contained in the tank completely immerses the film while it is being printed. A housing 46, FIG. 2, contains optics for transmitting light to a printing aperture, not specifically shown, on its lower end. First drive sprocket 48 typically has a double circumferential row of teeth engaging perforations of the film F. Printing sprocket 50 having a single row of teeth carries both the master strip of film and the raw stock past the printing aperture, in sprocket-registered alignment as taught in my referenced U.S. Pat. No. 4,105,329. The outer edge of the film is supported on a curved support member 50a, FIG. 3. Both strips of film then pass over a driven take-up sprocket 52 that is positioned above the printing tank. Sprocket 52, FIG. 2, typically has two rows of teeth for the 35 millimeter film.

Apparatus for powering the drive sprocket 48 of printing unit 20 or drive sprocket 48' of printing unit 20' will now be described with reference to FIGS. 3, 4 and 5. A sprocket drive shaft 54, shown in FIG. 4, is rotatably supported from the auxiliary plate 16. Take-up sprocket 48' is attached to the outer end of shaft 54. The second or armature plate 62 of a clutch is attached to the inner end of shaft 54.

Figure 5:
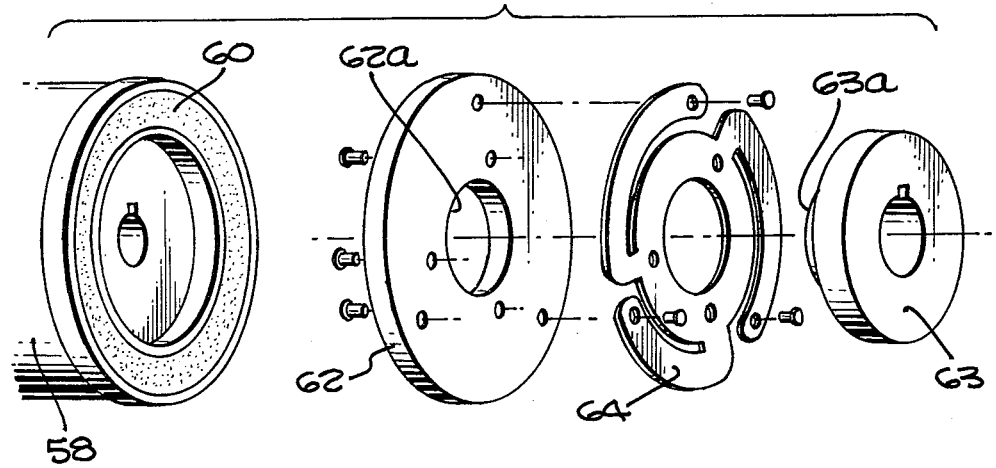
FIG. 5 is a perspective view of the two magnetic plates of one of the clutches.

The complete structure of the clutch is shown in FIGS. 4 and 5. A stationary field and coil assembly 58 is supported on the rear side of main frame member 10 in a relatively stationary position, although a slight amount of rotational movement is preferably permitted to occur. Lead wires 59 supply electric current to this coil assembly. A first clutch plate 60 is positioned on the front side of the coil assembly adjacent frame member 10. The first clutch plate 60 is in the form of a circular plate, or rotor, made of magnetic material, and it is attached to a driven shaft 70 which rotates inside the coil assembly 58.

The driven shaft 70 is best seen in FIG. 3. Its forward end rotates inside the coil assembly 58 and is secured to the rotor 60. Its rearward end is rotatably supported in an auxiliary frame 71 carried on the rear side of main frame member 10. Rotation is imparted to the driven shaft 70 by means of a "cog" or timing belt 72 which drives a timing belt pulley 73 carried on the shaft 70.

A collar 63, FIG. 5, is keyed to the sprocket driven shaft 54. Collar 63 on one side thereof has a centrally disposed cylindrical boss 63a that receives the central opening 62a of the second clutch plate 62, otherwise known as the armature. Armature 62 is also made of magnetic material. A spring leaf structure 64 is positioned between the collar 63 and the armature 62 and is secured to both of those members. The purpose of spring leaf structure 64 is to permit the armature 62 to moe axially away from the collar 63, when it is magnetically attracted by the rotor 60. When the magnetic attraction ceases, armature 62 moves back into engagement with collar 63. Thus as clearly shown in FIG. 3 there is normally a horizontal space between the rotor 60 and the armature 62. The driven shaft 70 and sprocket drive shaft 54 are concentrically aligned.

When electrical current is supplied in sufficient strength to the coil assembly 58, armature 62 is brought into a face-to-face frictional engagement with the rotor 60, and spring assembly 64 flexes enough to permit that movement to take place.

The illustrated type of clutch is properly described as a friction clutch whose action is electromagnatically controlled. The particular mechanism as presently illustrated is clutch coupling model BEC-26CC sold by Electroid Company, 45 Fadem Road, Springfield, N.J. 07081. A specific advantage of the clutch mechanism in its present application is that the magnitude of current supplied to coil assembly 58 can be precisely controlled, which in turn determines the maximum driving torque that can be imparted from rotor 60 to armature 62 before relative slippage between these two clutch plates occurs.

Although the presently illustrated clutch mechanism has two friction plates which are not normally engaged, and are brought into engagement by energizing a magnetic field, this phase of the operation may if desired be reversed. That is, a clutch mechanism may be used in which the plates are normally engaged, and a magnetic field is energized in order to disengage them.

While only a particular one of the drive assemblies has been described in detail, it will be understood that the other two drive assemblies incorporating sprockets 50 and 52 contained in each printing unit are constructed in the same manner. One additional feature, however, is that main sprocket drive shaft 70a which drives the main printing sprocket 50 also carries a large fly wheel 75. See FIG. 3.

As best seen in FIG. 4, the main frame member 10 has openings such as 10a, 10b through which the clutch plates or respective clutch assemblies can become interengaged. In the installed position of the printing module as shown in FIG. 3, each armature plate 62 is positioned entirely within the corresponding opening in frame member 10.

DRIVE AND CONTROL SYSTEM

Figure 6:
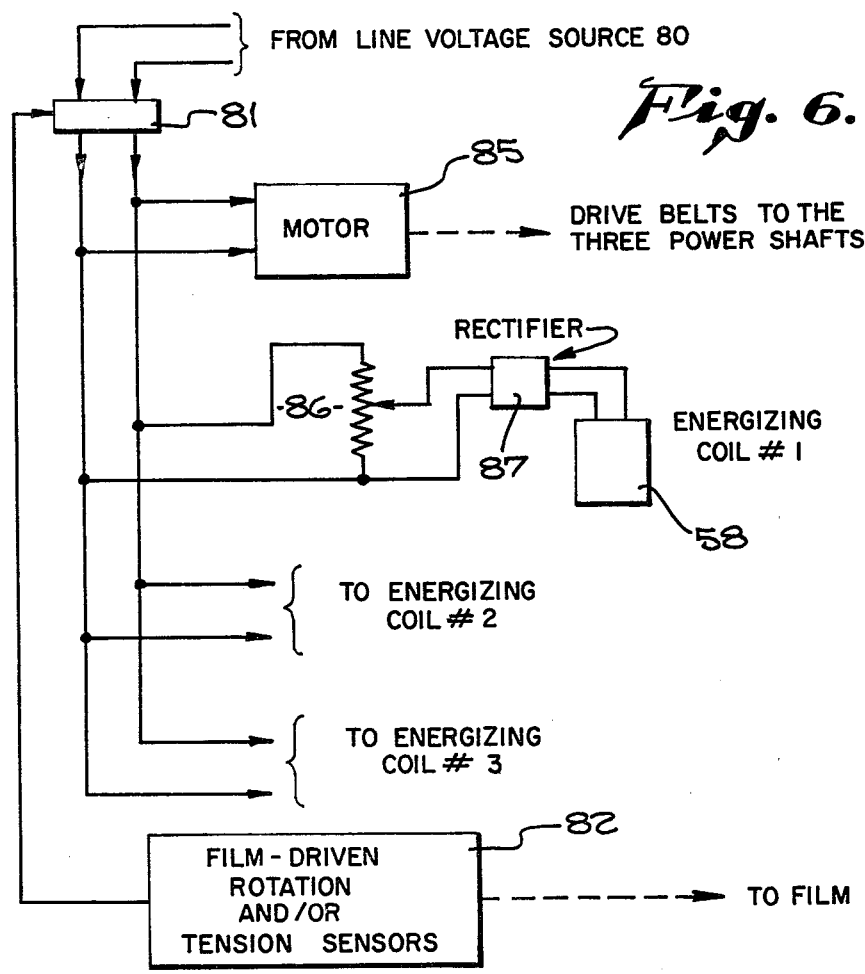
FIG. 6 is a schematic wiring diagram of the power and control circuits for one of the printing units.

Reference is now made to FIG. 6 illustrating the drive and control system for each printing module.

Alternating voltage from a source 80 passes through an interrupting switch 81 controlled by a sensor 82. Voltage is supplied to an appropriate main drive motor 85 that in turn is mechanically coupled through drive belts to all three of the driven shafts for the particular printing module.

The same voltage is also supplied, in parallel, to a rheostat 86 which, in accordance with a selected setting, reduces the value of the voltage. The output voltage from rheostat 86 passes through a rectifier 87 and hence to energizing coil 58. The same voltage is also supplied to second and third rheostats, not specifically shown, the output of each going through a separate rectifier for supplying the associated energizing coil.

Sensor 82 is a film driven rotational and/or tension sensor, that is, a rotational device over which the film passes. In the event that the film ceases to advance, an output signal from sensor 82 causes switch 81 to interrupt the power to the machine drive system. Sensor 82 also schematically indicates one or more conventional "brake-buckle" switches that may be used in the machine. Thus in FIG. 1, the rollers 83a, 83b, 83c are conventional "brake-buckles" associated respectively with the picture track, the sound track, and the raw stock. Any one of these devices will react to the breakage of the film passing over it for shutting off the interrupting switch 81. In similar fashion, other conventional "brake-buckles", not specifically shown, may be used for sensing excessive film tension in order to shut off the machine.

The circuit shown in FIG. 6 permits the selection of different levels of control energy for the three different clutches in the printing unit. These adjustments are advantageous because the machanical load on each drive sprocket is somewhat different. Furthermore, the optimum control of film tension in response to operating conditions may require individual adjustments to the lock-in torque for each clutch.

Alternatively, the clutches may be used simply as devices for selectively coupling or decoupling the printing module. According to that approach, the same energizing voltage is applied to the electromagnetic coils of all three clutches concurrently.

Although an alternating voltage source is shown in the present drawings, the drive and control system may if desired be energized entirely with direct current.

REMOVAL OF MODULAR UNIT

Figure 2:
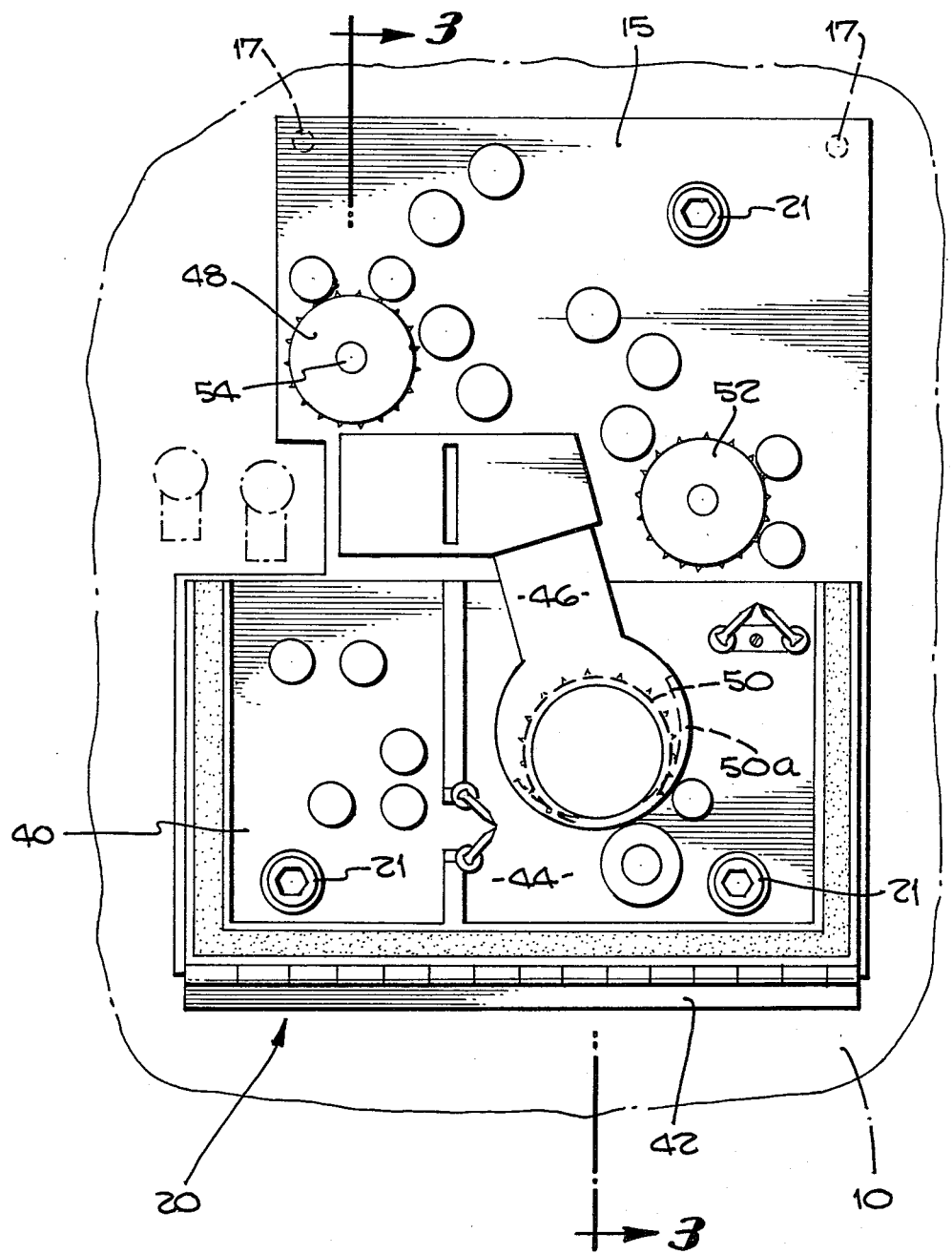
FIG. 2 is an elevation view of one of the printing units of the machine of FIG. 1.

FIGS. 2 and 3 show one of the modular printing units 20 in its attached relation to the main frame 10. FIG. 4 shows a modular printing unit 20' in a detached or separated relationship. While the modular unit 20 is designed to receive 35 millimeter film, the units are otherwise identical in their construction and operation.

Thus the auxiliary plate 15 has two dowel pins 17 protruding from its upper end which are inserted into corresponding openings in the main frame plate 10. Each armature plate 62 is at the same time inserted into an opening 10a, 10b, or 10c of plate 10. A set of three bolts 21, shown in FIG. 2, are then inserted through corresponding openings in the auxiliary plate 15 and secured in corresponding threaded openings in the plate 10 so as to firmly secure the module in its attached position.

Certain other connections, not specifically shown in the drawings, must be made in order to attach one of the printing modules to the machine. These other connections include electrical circuit connections for sensors and interlocks, fluid couplings for circulating liquid in the printing tank, and electrical connections for fluid switches associated with the control of the liquid body.

CONTROL OF FILM TENSION

A very important feature of the present invention is the separation of all the rotating parts of the machine into two separate inertia systems, one associated directly with the film and the other associated with the drive motor and fly wheel. Specifically, when the clutches are disengaged, the further movement of the film is continued only by virtue of its own inertia, the inertia of the drive sprockets on which it is transported, and the inertia of the sprocket drive shafts which carry the sprockets.

The power drive system mounted on the rear side of the frame plate 10 has far more inertia. The rotation of the drive motor, the timing belts and timing belt pulleys, the various driven shafts, and the fly wheel 75, involves a great deal of inertia. In particular, the fly wheel is included in the machine for the very purpose of preventing or at least minimizing any change in the rate of travel of the film.

Disengagement of the clutches, however, serves to completely decouple the film from its drive apparatus. It is therefore possible to stop the film promptly, without damage to its perforations, even though the drive motor and fly wheel are still rotating at relatively high speed.

The apparatus of the present invention not only provides a means for stopping the film entirely in response to certain conditions, but under other conditions protects the film from damage by limiting the amount of longitudinal tension that exists within the film. The physical characteristics of the film are such that it has a maximum safe driving tension, that is, the application of any greater amount of tension would be likely to damage the film or its perforations. According to the present invention the adjustments in the control circuit, FIG. 6, are set so as to apply only a specific amount of voltage to each energizing coil 58. Specifically, for the type of clutch as described this voltage may be 12 volts DC. With this amount of energization the electromagnetic field is strong enough to hold the clutch plates in engagement, with an amount of torque sufficient to drive the film forward, but not an amount sufficient to produce the maximum safe driving tension in the film. Therefore, when any type of mechanical difficulty occurs which causes the film tension to increase unexpectedly, the clutch plates will slip relative to each other and the maximum safe driving tension of the film will certainly not be exceeded, and probably will not even be reached. Slippage of the clutches will in turn cause sensor 82 to shut of the drive system.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. The method of continuously driving a perforated strip of film in a manner calculated to avoid damaging its perforations, the strip of film being characterized by a maximum safe driving tension, said method comprising the steps of:

selecting a toothed drive sprocket having circumferential teeth adapted to engage the corresponding perforations in the strip of film;

engaging the sprocket teeth with the film perforations;

selecting a magnetically controlled clutch having two relatively rotatable plates and also having circuit means energizable for establishing a selected degree of mechanical coupling between the plates;

selecting an alternating voltage source, rectifying the voltage from the source, and then applying the rectified voltage to the circuit means;

fixedly securing one clutch plate to the drive sprocket;

energizing the circuit means at a level sufficient to couple the clutch plates with an amount of torque sufficient to drive the strip of film but not sufficient to produce the maximum safe driving tension in the strip of film; and then rotatably driving the other clutch plate so as to advance the strip of film;

whereby if the film tension unexpectedly increases, the clutch plates will slip relative to each other before the maximum safe driving tension is exceeded.

2. The method of claim 1 which includes the additional steps of sensing the film movement, and discontinuing the rotational drive of the other clutch plate when film movement stops.

3. The method of claim 1 which includes the additional steps of sensing the film tension, and discontinuing the rotational drive of the other clutch plate when film tension falls outside of predetermined acceptable limits.

4. The method of selectively driving and selectively stopping a strip of film in a film printing machine, comprising the steps of:

selecting a drive sprocket having a circumferential row of teeth;

threading the strip of film upon the sprocket and engaging the sprocket teeth with the film perforations;

securing one plate of a friction clutch to the drive sprocket to rotate therewith;

selecting a drive motor;

coupling a second clutch plate of the friction clutch to the motor to rotate therewith;

coupling a fly wheel to the motor to rotate therewith, so as to maintain uniform film speed when the film is moving;

energizing the motor, and bringing the two clutch plates into engagement so as to drivingly advance the film; and when the film is to be stopped, bringing the clutch plates out of engagement so that the film will stop its movement while the motor and fly wheel are still rotating.

* * * * *